United States Patent
Ihmels (10) Patent No.: US 11,099,404 B2
(45) Date of Patent: Aug. 24, 2021

(54) SYSTEMS, DEVICES, AND METHODS FOR EMBEDDING A HOLOGRAPHIC OPTICAL ELEMENT IN AN EYEGLASS LENS

(71) Applicant: GOOGLE LLC, Mountain View, CA (US)

(72) Inventor: Darren Ihmels, Toronto (CA)

(73) Assignee: Google LLC, Mountain View, CA (US)

( * ) Notice: Subject to any disclaimer, the term of this patent is extended or adjusted under 35 U.S.C. 154(b) by 102 days.

(21) Appl. No.: 16/142,391

(22) Filed: Sep. 26, 2018

(65) Prior Publication Data
US 2019/0101761 A1    Apr. 4, 2019

Related U.S. Application Data

(60) Provisional application No. 62/565,677, filed on Sep. 29, 2017.

(51) Int. Cl.
*G02C 7/02*    (2006.01)
*G02B 27/01*   (2006.01)
*G02B 1/11*    (2015.01)
*B32B 37/12*   (2006.01)
*G02B 1/14*    (2015.01)

(52) U.S. Cl.
CPC .............. *G02C 7/022* (2013.01); *B32B 37/12* (2013.01); *G02B 1/11* (2013.01); *G02B 27/0172* (2013.01); *G02B 27/0176* (2013.01); *G02B 1/14* (2015.01); *G02B 2027/015* (2013.01); *G02B 2027/0174* (2013.01); *G02B 2027/0178* (2013.01); *G02C 2202/16* (2013.01)

(58) Field of Classification Search
CPC ....... G02C 7/02; G02C 7/022; G02C 2202/16

USPC ............................ 351/159.01, 159.57, 159.7
See application file for complete search history.

(56) References Cited

U.S. PATENT DOCUMENTS

| 5,360,501 A | 11/1994 | Bolt | |
| 9,568,734 B1* | 2/2017 | Giri | G02B 27/0081 |
| 9,897,886 B2 | 2/2018 | Mack et al. | |
| 2010/0045929 A1* | 2/2010 | Suzuki | G02B 27/0037 351/159.01 |
| 2013/0048214 A1* | 2/2013 | Kalkowski | C03C 27/10 156/325 |
| 2015/0002940 A1 | 1/2015 | Nister et al. | |
| 2015/0103404 A1 | 4/2015 | Rudy et al. | |

(Continued)

OTHER PUBLICATIONS

Non-Final Office Action dated May 21, 2020 for U.S. Appl. No. 16/142,396, 13 pages.

(Continued)

*Primary Examiner* — Darryl J Collins (57) ABSTRACT

Systems, devices, and methods for embedding a HOE in an eyeglass lens are described. A method of embedding a HOE in an eyeglass lens includes forming a world-side portion of the eyeglass lens, forming an eye-side portion of the eyeglass lens, physically coupling the eye-side portion of the eyeglass lens to the HOE with a low-temperature optically clear adhesive ("LT-OCA"), and physically coupling the world-side portion of the eyeglass lens to the HOE with LT-OCA. Forming the lens portions may include high-temperature processes, and the HOE may not be damaged by the high-temperature processes since the high-temperature processes may be performed on the lens portions prior to coupling the lens portions to the HOE.

14 Claims, 5 Drawing Sheets

(56) References Cited

U.S. PATENT DOCUMENTS

| | | |
|---|---|---|
| 2016/0103324 A1 | 4/2016 | Arakawa et al. |
| 2016/0178909 A1 | 6/2016 | Komatsu et al. |
| 2016/0291543 A1* | 10/2016 | Saito .................... G03H 1/0248 |
| 2016/0370589 A1 | 12/2016 | Wang et al. |
| 2017/0123207 A1 | 5/2017 | Kress et al. |
| 2018/0003974 A1* | 1/2018 | Wade .................... G03H 1/0256 |
| 2019/0025590 A1 | 1/2019 | Haddick |
| 2019/0101762 A1* | 4/2019 | Ihmels ............... G02B 27/0172 |
| 2019/0101763 A1* | 4/2019 | Ihmels ............... G02B 27/0172 |
| 2019/0278086 A1 | 9/2019 | Ofir |
| 2020/0039157 A1 | 2/2020 | Yoshimura |

OTHER PUBLICATIONS

Final Office Action dated May 15, 2020 for U.S. Appl. No. 16/142,398, 14 pages.

Non-Final Office Action dated May 15, 2020, for U.S. Appl. No. 16/142,398, 19 pages.

* cited by examiner

SYSTEMS, DEVICES, AND METHODS FOR EMBEDDING A HOLOGRAPHIC OPTICAL ELEMENT IN AN EYEGLASS LENS

BACKGROUND

Technical Field

The present systems, devices, and methods generally relate to eyeglass lenses and particularly relate to embedding a holographic optical element in an eyeglass lens.

Description of the Related Art

Eyeglass Lenses

Eyeglass lenses are objects made of a transparent lens material, typically glass or plastic, that can be mounted in eyeglass lens frames. Eyeglass lenses may be converging lenses, diverging lenses, or plano. Converging and diverging lenses may provide vision correction as prescribed by an optometrist. Plano lenses may provide light blocking, as in sunglasses, or they may be worn solely for their aesthetic appeal.

Eyeglass lenses may be manufactured by a grinding process, wherein material is carefully removed from a preformed "blank" (already of approximately the shape of the lens) to yield a lens with the correct shape. Eyeglass lenses may also be manufactured by a molding process, wherein a mold of the correct shape of the lens is filled with fluid plastic or glass; the fluid is then hardened by cooling or curing the plastic or glass. Once manufactured to the correct shape, eyeglass lenses typically require polishing to achieve a smooth surface. Eyeglass lenses may be coated to increase scratch resistance, block UV light transmission, or reduce reflections.

Holographic Optical Elements

An optic or optical element is a material which, when exposed to light, refracts, diffracts, attenuates or otherwise modifies the properties of the light. A hologram or holographic optical element (HOE) is an optical element that comprises a series of ridges or fringes that form an optical element by diffracting light. Non-limiting examples of optical elements whose function may be replicated by a HOE include a lens, a mirror, a filter, a beamsplitter, a prism, a diffuser, a grating, and a polarizer.

HOEs are generally fabricated using light-reactive substances, which when exposed to light under the correct conditions form a series of very small and carefully spaced fringes; it is the combined set of fringes that form the HOE. Non-exclusive examples of light reactive substances are silver-halide emulsions and photopolymers. The small size and careful spacing of the fringes makes the fringes fragile; i.e., any deformation of the HOE will cause damage which is generally irreversible. Deformation could be caused by mechanical forces or high temperatures which may cause the fringes or the material between the fringes to melt or expand.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

An eyeglass lens for use in a wearable heads-up display may be summarized as including a lens assembly including an eye-side lens portion; and a world-side lens portion; a holographic optical element ("HOE") positioned within the lens assembly in between the eye-side lens portion and the world-side lens portion; a first low-temperature optically clear adhesive ("LT-OCA") layer disposed between the HOE and the eye-side lens; and a second LT-OCA layer disposed between the HOE and the world-side lens portion. The world-side lens portion may include a world-side surface, and the world-side lens portion may further include a coating layer disposed on the world-side surface of the world-side lens portion, the coating layer including a high-temperature coating. The eye-side lens portion may include an eye-side surface, and the eye-side lens portion may further include a coating layer located on the eye-side surface of the eye-side lens portion, the coating layer including a high-temperature coating. The HOE may include a photopolymer layer and a protective layer. The world-side lens portion may include a curved world-side surface and the eye-side lens portion may include a curved eye-side surface. The HOE may be planar, and the world-side lens portion may include a planar eye-side surface and the eye-side lens portion may include a planar world-side surface. The HOE may be curved around a center or axis of curvature located on the eye-side of the eyeglass lens, and the world-side lens portion may include a curved eye-side surface and the eye-side lens portion may include a curved world-side surface. The first LT-OCA layer and the second LT-OCA layer may both include a cured LT-OCA. The lens assembly may have a refractive power in a range of −20 to +20 diopters. The eye-side lens portion may include a first lens material and the world-side lens portion may include a second lens material, and the first lens material and the second lens material may be the same lens material. The eye-side lens portion may include a first lens material and the world-side lens portion may include a second lens material, and the first lens material may be different from the second lens material. The first LT-OCA layer may include a first LT-OCA and the second LT-OCA layer may include a second LT-OCA layer, and the first LT-OCA and the second LT-OCA may be the same LT-OCA. The first LT-OCA layer may include a first LT-OCA and the second LT-OCA layer may include a second LT-OCA layer, and the first LT-OCA may be different from the second LT-OCA.

A wearable heads-up display may be summarized as including a support structure; an projector; and a transparent combiner positioned and oriented to appear in a field of view of an eye of a user when the support structure is worn on a head of the user, the transparent combiner including a lens assembly, wherein the lens assembly includes an eye-side lens portion; and a world-side lens portion; a holographic optical element ("HOE") positioned within the lens assembly in between the eye-side lens portion and the world-side lens portion; a first low-temperature optically clear adhesive ("LT-OCA") layer disposed between the HOE and the eye-side lens portion of the lens assembly; and a second LT-OCA layer disposed between the HOE and the world-side lens portion of the lens assembly.

The world-side lens portion may include a world-side surface, and the world-side lens portion may further include a coating layer disposed on the world-side surface of the world-side lens portion, the coating layer including a high-temperature coating.

The eye-side lens portion may include an eye-side surface, and the eye-side lens portion may further include a coating layer disposed on the eye-side surface of the eye-side lens portion, the coating layer including a high-temperature coating. The HOE may include a photopolymer layer and a protective layer. The world-side lens portion may include a curved world-side surface and the eye-side lens portion may include a curved eye-side surface. The HOE may be planar, and the world-side lens portion may include a planar eye-side surface and the eye-side lens portion may include a planar world-side surface. The HOE may be curved around a center or axis of curvature located on the eye-side of the eyeglass lens, and the world-side lens portion may include a curved eye-side surface and the eye-side lens portion may include a curved world-side surface. The first LT-OCA layer and the second LT-OCA layer may both include a cured LT-OCA layer. The lens assembly may have a refractive power in a range of −20 to +20 diopters. The eye-side lens portion may include a first lens material and the world-side lens portion may include a second lens material, and the first lens material and the second lens material may be the same lens material. The eye-side lens portion may include a first lens material and the world-side lens portion may include a second lens material, and the first lens material may be different from the second lens material. The first LT-OCA layer may include a first LT-OCA and the second LT-OCA layer may include a second LT-OCA layer, and the first LT-OCA and the second LT-OCA may be the same LT-OCA. The first LT-OCA layer may include a first LT-OCA and the second LT-OCA layer may include a second LT-OCA layer, and the first LT-OCA may be different from the second LT-OCA.

A method of embedding a holographic optical element ("HOE") in an eyeglass lens for use in a wearable heads-up display may be summarized as including forming an eye-side portion of the eyeglass lens; forming a world-side portion of the eyeglass lens; physically coupling a world-side surface of the eye-side portion of the eyeglass lens to an eye-side surface of the HOE with a first layer of low-temperature optically clear adhesive ("LT-OCA"); and physically coupling an eye-side surface of the world-side portion of the eyeglass lens to a world-side surface of the HOE with a second layer of LT-OCA. Forming an eye-side portion of the eyeglass lens may include forming the eye-side portion of the eyeglass lens at a temperature that exceeds the maximum stable temperature of the HOE. Forming a world-side portion of the eyeglass lens may include forming the world-side portion of the eyeglass lens at a temperature that exceeds a maximum stable temperature of the HOE.

The method may further include curing the LT-OCA at a temperature that is below the maximum stable temperature of the HOE. Curing the LT-OCA may include photo-curing the LT-OCA. Forming a world-side portion of the eyeglass lens may include shaping the world-side portion of the eyeglass lens to have a curved world-side surface; and forming an eye-side portion of the eyeglass lens may include shaping the eye-side portion of the eyeglass lens to have a curved eye-side surface. The HOE may be planar, and forming a world-side portion of the eyeglass lens may include shaping the world-side portion of the eyeglass lens to have a planar eye-side surface; and forming an eye-side portion of the eyeglass lens may include shaping the eye-side portion of the eyeglass lens to have a planar world-side surface. Forming a world-side portion of the eyeglass lens may include shaping the world-side portion of the eyeglass lens to have a curved eye-side surface; and forming an eye-side portion of the eyeglass lens may include shaping the eye-side portion of the eyeglass lens to have a curved world-side surface.

The method may further include applying a curvature to the HOE, wherein the center or axis of the applied curvature is located on the eye-side of the eyeglass lens. Shaping the world-side portion of the eyeglass lens to have a curved world-side surface and shaping the eye-side portion of the eyeglass lens to have a curved eye-side surface may be performed together to provide the eyeglass lens with a refractive power in a range of −20 to +20 diopters.

The HOE may include at least one photopolymer layer and the method may further include forming the HOE, wherein forming the HOE includes recording at least one hologram in the at least one photopolymer layer.

The method may further include applying at least one coating to at least one surface of the eyeglass lens.

Forming a world-side portion of the eyeglass lens may include forming a world-side portion of the eyeglass lens wherein the world-side portion of the eyeglass lens includes a first lens material; forming an eye-side portion of the eyeglass lens may include forming an eye-side portion of the eyeglass lens wherein the eye-side portion of the eyeglass lens includes a second lens material; and the first lens material may be different from the second lens material.

Physically coupling an eye-side surface of the world-side portion of the eyeglass lens to a world-side surface of the HOE with a first layer of LT-OCA may include physically coupling an eye-side surface of the world-side portion of the eyeglass lens to a world-side surface of the HOE with a first layer of LT-OCA wherein the first layer of LT-OCA includes a first LT-OCA; physically coupling a world-side surface of the eye-side portion of the eyeglass lens to an eye-side surface of the HOE with a second layer of LT-OCA may include physically coupling a world-side surface of the eye-side portion of the eyeglass lens to an eye-side surface of the HOE with a second layer of LT-OCA wherein the second layer of LT-OCA OCA includes a second LT-OCA layer; and the first LT-OCA may be different from the second LT-OCA.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for embedding a holographic optical element (HOE) in an eyeglass lens and are particularly well-suited for use in wearable heads-up displays ("WHUDs").

Additional functionality may be imparted to an eyeglass lens by embedding a HOE in the eyeglass lens. The additional functionality provided by the HOE may, for example, enable the eyeglass lens to be used in advanced optical devices, including performing the role of transparent optical combiner in a WHUD. The HOE may comprise N holograms, where $N \geq 1$; at least two of the N holograms may be located in a single layer of the HOE ("multiplexed holograms"); each of the N holograms may be located in a respective one of N layers in the HOE. A person of skill in the art will appreciate that a HOE may include non-holographic diffractive elements, non-exclusive examples of non-holographic diffractive elements include a volume diffraction grating, a surface relief diffraction grating, a transmission grating, or a reflection grating.

In some implementations, the HOE may be carried on or by another structure. For instance, one or more HOEs may be carried on or by a waveguide or lightguide structure and may serve as, for example, an in-coupler or out-coupler for such waveguide or lightguide structure. In such implementations, at least a portion (or an entirety) of the waveguide or lightguide structure may be embedded within an internal volume of an eyeglass. Thus, for the purposes of the present systems, device, and methods, including the appended claims, the term "HOE" includes a diffractive material combined with waveguide/lightguide structures. Likewise, when the term "HOE" is used, the HOE may be carried on or by other structures or layers, or may itself carry other structures or layers, depending on the specific implementation.

Embedding a HOE in an internal volume of an eyeglass lens protects the HOE from damage; a HOE located on an outer surface of an eyeglass lens is easy to scratch, smudge, or otherwise physically damage. A person of skill in the art will appreciate that an eyeglass lens is one example of a lens, and that a HOE may be embedded in non-eyeglass lenses.

Typical methods for embedding a layer of material in an eyeglass lens include hot-pressing, welding, lamination, injection molding, and gluing; typically with the use of high temperature and/or harsh chemicals that allow products to be manufactured quickly and inexpensively. Exposure to harsh chemicals and/or temperatures above the maximum stable temperature of a HOE will generally deform a HOE, causing irreparable damage to the HOE and consequent loss of optical performance. A typical HOE may have a maximum stable temperature of 60° C., 80° C., 100° C., or 120° C., where a higher maximum stable temperature corresponds to a more physically robust HOE. A person of skill in the art will appreciate that a more physically robust HOE typically has poorer HOE performance (for example, lower efficiency, lower transparency, and/or greater side lobes), therefore a HOE with a lower maximum stable temperature is advantageous.

Eyeglass lens fabrication may include processes which require the eyeglass lens to be heated above the maximum stable temperature of the HOE. Non-exclusive examples of eyeglass lens fabrication processes that require the eyeglass lens to be heated above the maximum stable temperature of the HOE include: annealing the eyeglass lens and curing at least one coating applied to the eyeglass lens.

A protective material may be used to protect a HOE. A protective material is a material that provides the HOE with increased resistance to harsh chemicals and/or elevated temperatures. A protective material may increase the maximum stable temperature of a HOE by up to 40° C., however the increased maximum stable temperature of the HOE is still typically below the temperature of at least one eyeglass lens fabrication process.

A HOE may be embedded in an eyeglass lens without causing damage to the HOE if the lens undergoes all high-temperature processes prior to embedding the HOE via a low-temperature process.

Figure 1:
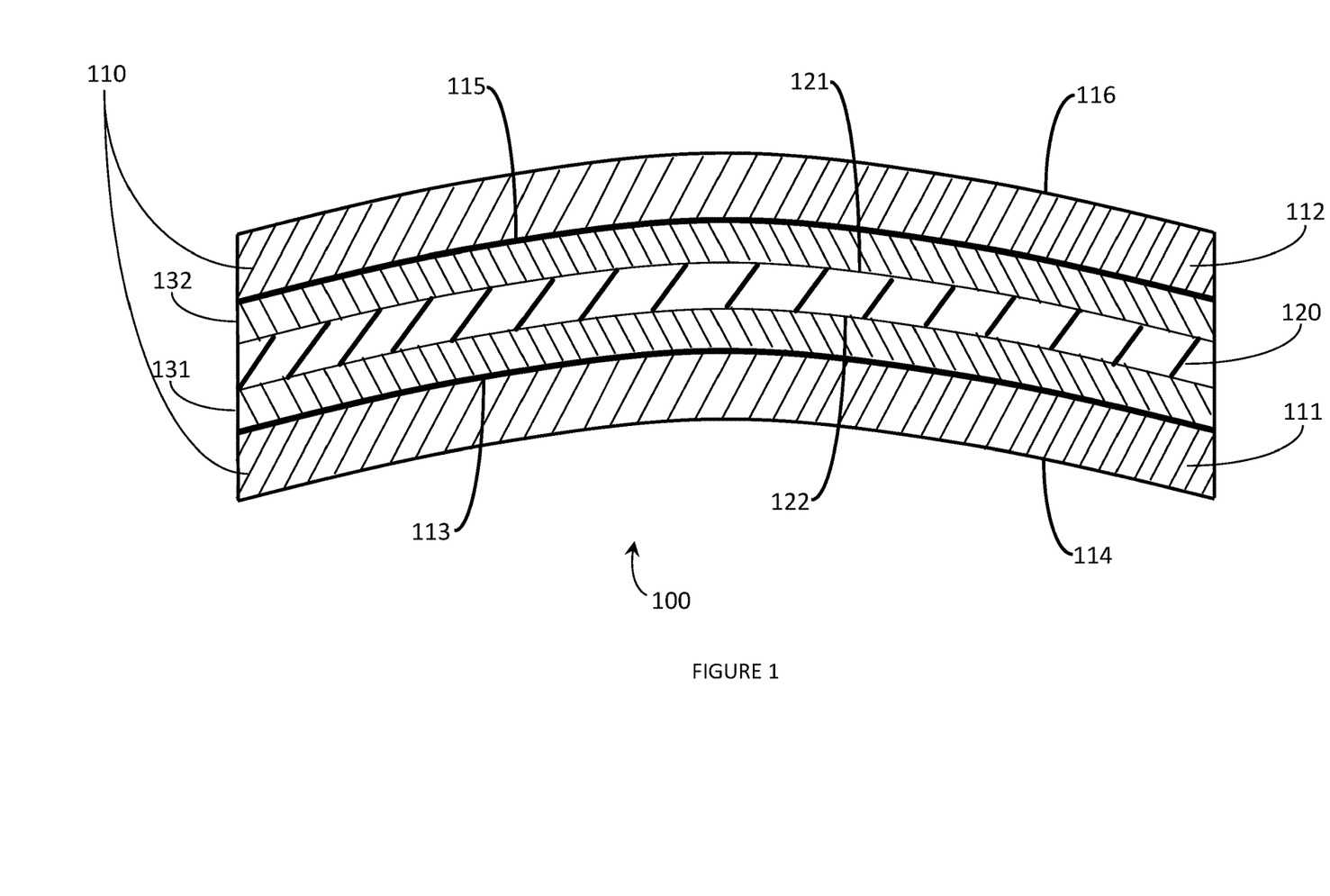
FIG. 1 is a cross-sectional view of an exemplary eyeglass lens with an embedded HOE suitable for use as a transparent combiner in a WHUD in accordance with the present systems, devices, and methods.

FIG. 1 is a cross-sectional view of an exemplary eyeglass lens 100 with an embedded HOE 120 suitable for use as a transparent combiner in a WHUD in accordance with the present systems, devices, and methods. Eyeglass lens 100 with an embedded HOE 120 comprises lens assembly 110, HOE 120, first low-temperature optically clear adhesive ("LT-OCA") layer 131, and second LT-OCA layer 132. An optically clear adhesive (OCA) is an optically transparent material that bonds one surface to another surface; typically the surfaces bonded together with an OCA are both optically transparent. Non-exclusive examples of OCAs include a flexible adhesive tape and a curable liquid adhesive. A LT-OCA is an OCA that is applied and, if necessary or otherwise advantageous, cured at temperatures below 40° C. The use of a LT-OCA in an eyeglass lens with embedded HOE is advantageous because the LT-OCA may be applied and/or cured at a temperature below the maximum stable temperature of the HOE, thus preventing damage to the HOE.

Throughout this specification and the appended claims, the term "layer" generally refers to a thickness of some material that provides and/or is spread over a surface, such as a stratum or a coating on a surface. A layer may include or cover a single side or face of a structure, such as a dielectric layer in a printed circuit board or a layer of cheese on a pizza, or a layer may include or cover multiple sides or faces of a three-dimensional structure, such as a layer of clothing or a layer of planet Earth (e.g., the crust, mantle, etc.). A person of skill in the art will appreciate that the material of one layer may form the substrate of another layer.

Throughout this specification and the appended claims, the term "eye-side" refers to the side of the eyeglass lens that, when employed in a device worn by a user, faces towards the eye of the user, while the term "world-side" refers to the side of the eyeglass lens that, when employed in a device worn by a user, faces away from the eye of the user and towards the outside world.

In a first implementation, lens assembly 110 comprises eye-side lens portion 111 and world-side lens portion 112. HOE 120 is positioned within lens assembly 110 in between eye-side lens portion 111 and world-side lens portion 112. First LT-OCA layer 131 is disposed between HOE 120 and eye-side lens portion 111. Second LT-OCA layer 132 is disposed between HOE 120 and world-side lens portion 112. In a second implementation, lens assembly 110 comprises world-side lens portion 112 (eye-side lens portion 111 is omitted from the second implementation); first LT-OCA layer 131 is also omitted from the second implementation. In a third implementation, lens assembly 110 comprises eye-side lens portion 111 (world-side lens portion 112 is omitted from the third implementation); second LT-OCA layer 132 is also omitted from the third implementation. The second implementation is similar is some ways to the first implementation, where the second implementation and first implementation differ in the number and location of lens portions and LT-OCA layers. The third implementation is similar is some ways to the first implementation, where the third implementation and first implementation differ in the number and location of lens portions and LT-OCA layers.

World-side lens portion 112 may include a world-side surface of the world-side lens portion 116. World-side surface of the world-side lens portion 116 may further comprise a coating layer disposed on world-side surface of the world-side lens portion 116, and the coating layer may comprise a high-temperature coating. Non-exclusive examples of coating layers include hard coats, anti-reflective coatings, tints (including neutral density, colored, wavelength specific, and photochromic coats), and electrochromic coatings. High-temperature coatings include coatings that require temperatures above 25° C. when applying and or curing the coating. For example, a high-temperature coating may require temperatures greater than 80° C., greater than 100° C., or greater than 120° C. when applying or curing the coating. High-temperature coatings may have better performance than coatings applied and/or cured at a lower temperature. For example, a hard coat cured at 120° C. creates a coating with greater hardness than the same hard coat cured at 80° C., which is advantageous since a hard coat with greater hardness is better able to resist scratches and prevent damage to the surface of the eyeglass lens. Eye-side lens portion 111 may include an eye-side surface of the eye-side lens portion 114. Eye-side surface of the eye-side lens portion 114 may further comprise a coating layer disposed on eye-side surface of the eye-side lens portion 114, and the coating layer may comprise a high-temperature coating.

Figure 4:
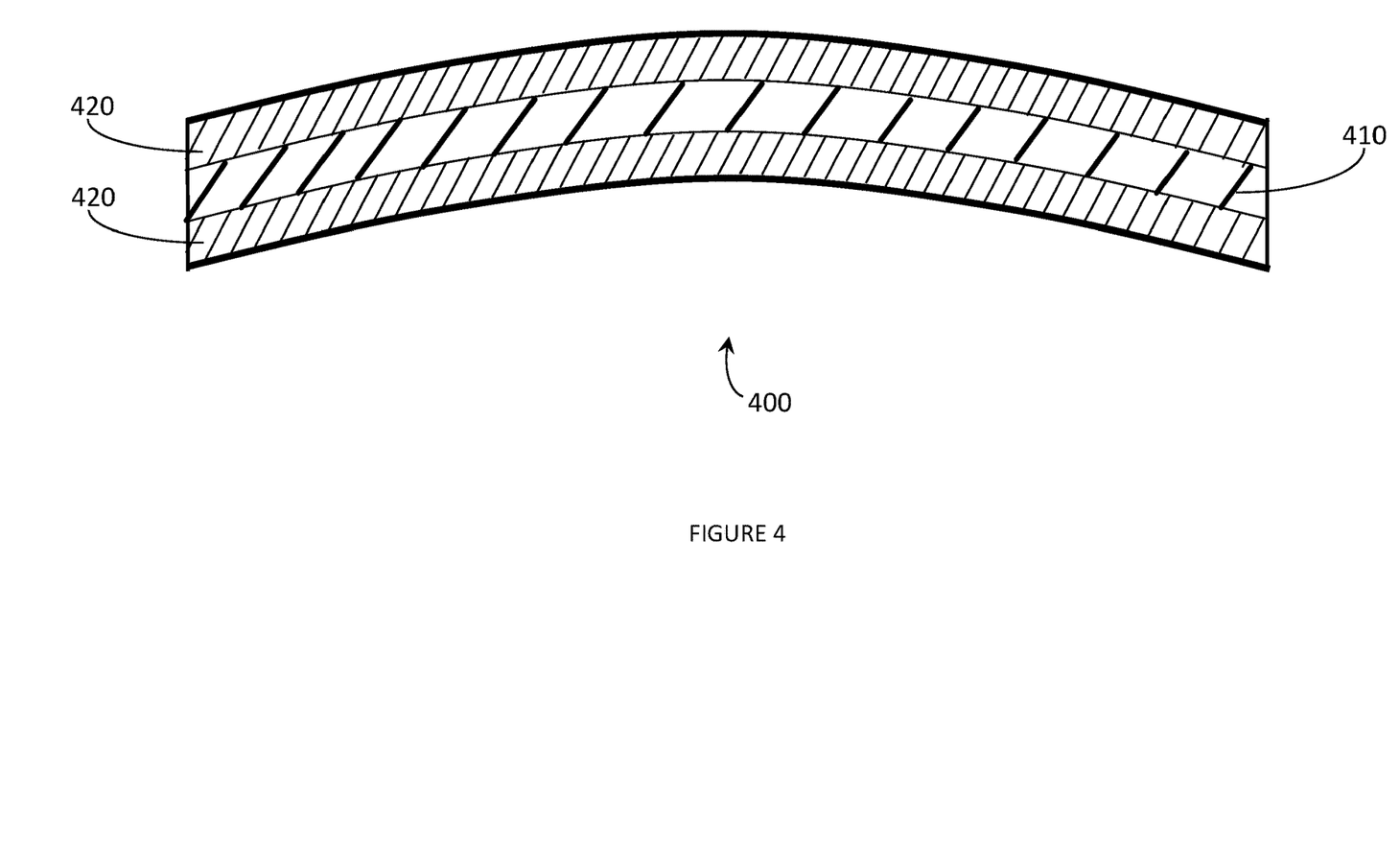
FIG. 4 is a cross-sectional view of an exemplary HOE suitable for use as a HOE embedded in an eyeglass lens in accordance with the present systems, devices, and methods.

FIG. 4 is a cross-sectional view of an exemplary HOE 400 suitable for use as a HOE embedded in an eyeglass lens in accordance with the present systems, devices, and methods. HOE 400 may be substantively similar to HOE 120. HOE 400 comprises an inner layer 410 which may include, for example, a photopolymer material. Inner layer 410 may comprise a lightguide. The holographic component of HOE 400 may be recorded in or otherwise carried by inner layer 410 (e.g., a holographic optical element including one or more hologram(s), a holographic incoupler, and/or a holographic outcoupler). Inner layer 410 is encapsulated by protective layer 420, which may include, for example, a polycarbonate material. A protective layer increases the chemical and thermal resistance of the inner layer, preventing the inner layer from being damaged by the application and curing of the LT-OCA. HOE 400 may comprise low refractive index layer 430; low refractive index layer 430 improves the performance inner layer 410 (if inner layer 410 comprises a light guide) by increasing the difference in refractive index at the surface of the light guide (a greater difference in refractive index at the surface of the light guide improves the performance of said light guide). HOE 400 may comprise internal anti-reflective layer 440; internal anti-reflective layer 440 reduces the reflection of light due to the difference in refractive index between low refractive index layer 430 and protective layer 420, improving the transparency of HOE 400. Inner layer 410 may comprise an electrochromic material.

Returning to FIG. 1, eye-side surface of the eye-side lens portion 114 may be a curved surface. A curved surface may be a spherically curved surface; a spherically curved surface is curved around a center of curvature. A curved surface may be a cylindrically curved surface; a cylindrically curved surface is curved around an axis of curvature. The center or axis of curvature, as appropriate, of eye-side surface of the eye-side lens portion 114 may be located on the eye-side of eyeglass lens 100 at a distance of between 1 and 10 centimeters, between 10 and 50 cm, or between 50 and 100 cm from eye-side surface of the eye-side lens portion 114. World-side surface of the world-side lens portion 116 may be a curved surface, wherein the center or axis of curvature of world-side surface of the world-side lens portion 116, as appropriate, may be located on the eye-side of eyeglass lens 100 at a distance of between 1 and 10 centimeters, between 10 and 50 cm, or between 50 and 100 cm from eye-side surface of the eye-side lens portion 114. Curved lenses have increased aesthetic appeal compared to flat, planar lenses.

World-side lens portion 112 may include an eye-side surface of the world-side lens portion 115. Eye-side lens portion 111 may include a world-side surface of the eye-side lens portion 113. HOE 120 may comprise a curved HOE, where the center or axis of curvature, as appropriate, of HOE 120 may be located on the eye-side of eyeglass lens 100 at a distance of between 1 and 10 centimeters, between 10 and 50 cm, or between 50 and 100 cm from eye-side surface of the eye-side lens portion 114. World-side surface of the eye-side lens portion 113 may comprise a curved surface, wherein the center or axis of curvature, as appropriate, of world-side surface of the eye-side lens portion 113 may be located on the eye-side of eyeglass lens 100 at a distance of between 1 and 10 centimeters, between 10 and 50 cm, or between 50 and 100 cm from eye-side surface of the eye-side lens portion 114. Eye-side surface of the world-side lens portion 115 may comprise a curved surface, wherein the center or axis of curvature, as appropriate, of eye-side surface of the world-side lens portion 115 may be located on the eye-side of eyeglass lens 100 at a distance of between 1 and 10 centimeters, between 10 and 50 cm, or between 50 and 100 cm from eye-side surface of the eye-side lens portion 114. A curved HOE is easier to fit entirely within the internal volume of a curved eyeglass lens. If the HOE contains at least one recorded hologram, and the at least one hologram was recorded on an initially planar HOE, the HOE may need to be curved prior to embedding the HOE in an eyeglass lens. The HOE may require an astigmatism correction due to the application of curvature. If HOE 120 is curved, a curved world-side surface of the eye-side lens portion 113 and a curved eye-side surface of the world-side lens portion 115 are easier to adhere to HOE 120 with LT-OCA.

Lens assembly 110 may have a refractive power in a range of −20 to +20 diopters. A lens assembly with a refractive power may be used for vision correction as prescribed by an optometrist. The refractive power for vision correction may be formed by applying a curvature to eye-side surface of the world-side lens portion 115. The refractive power for vision correction may be formed by applying a curvature to world-side surface of the eye-side lens portion 113.

Figure 5:
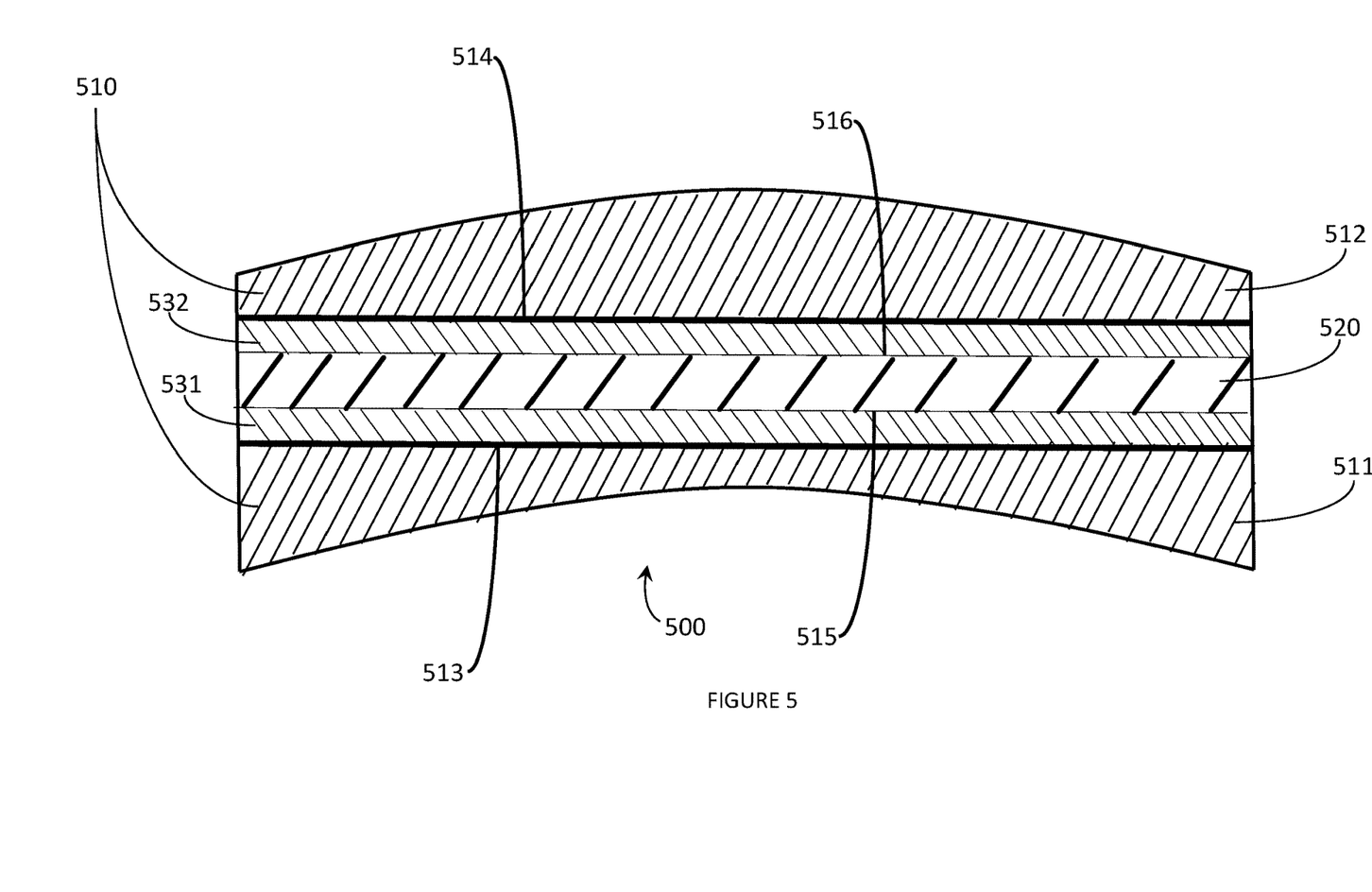
FIG. 5 is a cross-sectional view of an exemplary eyeglass lens with embedded planar HOE suitable for use as a transparent combiner in a WHUD in accordance with the present systems, devices, and methods.

FIG. 5 is a cross-sectional view of an exemplary eyeglass lens 500 with embedded planar HOE 520 suitable for use as a transparent combiner in a WHUD in accordance with the present systems, devices, and methods. Eyeglass lens 500 with embedded planar HOE 520 may be substantively similar to eyeglass lens 100. Eyeglass lens 500 with an embedded HOE 520 comprises lens assembly 510, HOE 520, first LT-OCA layer 531, and second LT-OCA layer 532. Lens assembly 510 comprises eye-side lens portion 511 and world-side lens portion 512. HOE 520 is positioned within lens assembly 510 in between eye-side lens portion 511 and world-side lens portion 512. First LT-OCA layer 531 is disposed between HOE 520 and eye-side lens portion 511. Second LT-OCA layer 532 is disposed between HOE 520 and world-side lens portion 512.

HOE 520 comprises a planar HOE, wherein eye-side surface of the HOE 515 comprises a planar surface, world-side surface of the HOE 516 comprises a planar surface, and eye-side surface of the HOE 515 and world-side surface of the HOE 516 are parallel. A planar HOE is advantageous since the planar HOE may be used as a transparent holographic combiner without the need to apply an astigmatism correction. World-side surface of the eye-side lens portion 513 comprises a planar surface. Eye-side surface of the world-side lens portion 514 comprises a planar surface. Planar eye side surface of the HOE 515 and planar world-side surface of the HOE 516 allow for easier and/or stronger adhesion between planar HOE 520, eye-side lens portion 511, and world-side lens portion 512 with LT-OCA.

Returning to FIG. 1, first LT-OCA layer 131 may comprise a cured LT-OCA layer. Second LT-OCA layer 132 may comprise a cured LT-OCA layer. A cured LT-OCA is able to maintain a strong adhesive bond for a greater amount of time than an un-cured LT-OCA.

Eye-side lens portion 111 may comprise a first lens material. World-side lens portion 112 may comprise a second lens material. The first lens material may be different from the second lens material. The first lens material may possess at least one property relative to the second lens material selected from a group consisting of: lower birefringence, higher transmittance of light of at least one wavelength, higher refractive index, lower refractive index, lower impact resistance, lower strength. The first lens material possessing at least one of: lower birefringence, higher transmittance of light of at least one wavelength, higher refractive index, and lower refractive index may be advantageous for the playback performance of a hologram which may be embedded in the HOE; hologram playback only occurs through eye-side lens portion 111. If the first lens material possessing at least one of: lower impact resistance, and lower strength necessarily means that the second lens material possesses at least one of: higher impact resistance and higher strength. Increases in impact resistance and strength of the second lens material make the eyeglass lens better able to meet ANSI ASC Z80 safety standards without affecting hologram playback if a hologram is embedded in HOE 120, since hologram playback does not occur through world-side lens portion 112. The first lens material and the second lens material may be the same lens material.

First LT-OCA layer 131 may comprise a first LT-OCA. Second LT-OCA layer 132 may comprise a second LT-OCA. The first LT-OCA and the second LT-OCA may be the same LT-OCA. The first LT-OCA and the second LT-OCA may comprise different LT-OCAs. If eye-side lens portion 111 and world-side lens portion 112 comprise different lens materials, the use different LT-OCAs is advantageous since different LT-OCAs may provide stronger adhesion to different lens materials.

Figure 2:
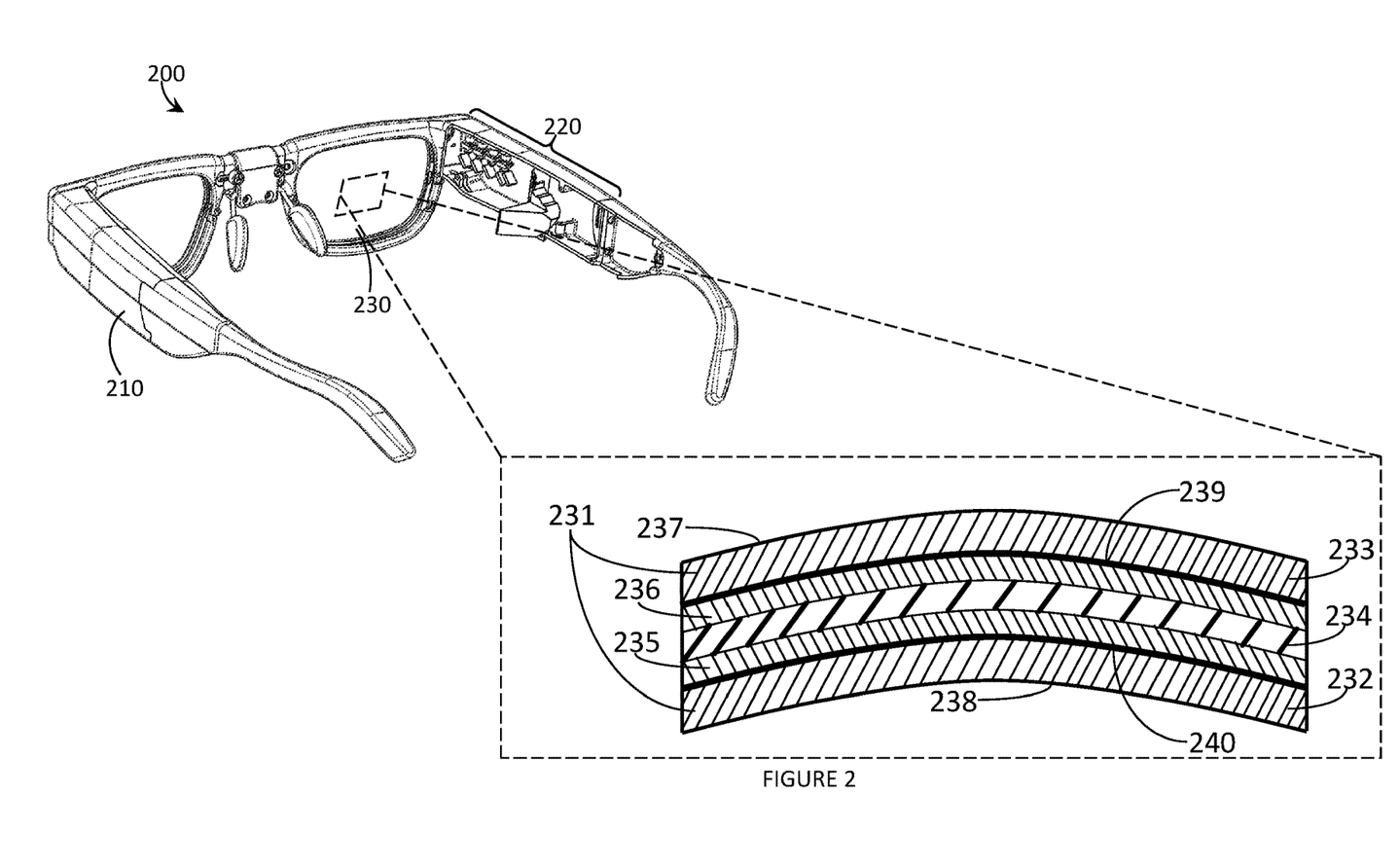
FIG. 2 is a partial-cutaway perspective view of a WHUD that includes an eyeglass lens with an embedded HOE in accordance with the present systems, devices, and methods.

FIG. 2 is a partial-cutaway perspective view of a WHUD 200 that includes an eyeglass lens 230 with an embedded HOE 233 in accordance with the present systems, devices, and methods. Eyeglass lens 230 may be substantially similar to eyeglass lens 100 from FIG. 1. WHUD 200 comprises a support structure 210 that is worn on the head of the user and has a general shape and appearance of an eyeglasses (e.g., sunglasses) frame. Support structure 210 carries multiple components, including: a projector 220, and an eyeglass lens 230. Projector 220 is positioned and oriented to direct light towards the eyeglass lens and may include, for example, a micro-display system, a scanning laser projection system, a scanning LED projection system, a digital light processing projector, or a spatial light modulation projector. FIG. 2 provides a partial-cutaway view in which regions of support structure 210 have been removed in order to render visible portions of projector 220 and clarify the location of projector 220 within WHUD 200. Eyeglass lens 230 is positioned within a field of view of an eye of the user when the support structure is worn on the head of the user and serves as both a conventional eyeglass lens (i.e., prescription or non-prescription depending on the needs of the user) and a transparent combiner.

FIG. 2 includes a detailed top-down view of eyeglass lens 230. Eyeglass lens 230 comprises lens assembly 231, HOE 234, first LT-OCA layer 235, and second LT-OCA layer 236. Lens assembly 231 comprises eye-side lens portion 232 and world-side lens portion 233. HOE 234 is positioned within lens assembly 231 in between eye-side lens portion 232 and world-side lens portion 233. First LT-OCA layer 235 is disposed between HOE 234 and eye-side lens portion 232. Second LT-OCA layer 236 is disposed between HOE 234 and world-side lens portion 233.

World-side lens portion 233 may include a world-side surface of the world-side lens portion 237. World-side surface of the world-side lens portion 237 may further comprise a coating layer disposed on world-side surface of the world-side lens portion 237, and the coating layer may comprise a high-temperature coating. Eye-side lens portion 232 may include an eye-side surface of the eye-side lens portion 238. Eye-side surface of the eye-side lens portion 238 may further comprise a coating layer disposed on eye-side surface of the eye-side lens portion 238, and the coating layer may comprise a high-temperature coating.

HOE 234 may be substantively similar to HOE 400. World-side surface of the world-side lens portion 237 may be a curved surface. Eye-side surface of the eye-side lens portion 238 may be a curved surface. World-side lens portion 233 may include an eye-side surface of the world-side lens portion 239. Eye-side lens portion 232 may include a world-side surface of the eye-side lens portion 240. HOE 234 may comprise a planar HOE. World-side surface of the eye-side lens portion 240 may comprise a planar surface. Eye-side surface of the world-side lens portion 239 may comprise a planar surface.

HOE 234 may comprise a curved HOE, wherein the center or axis of curvature, as appropriate, of HOE 234 may be located on the eye-side of eyeglass lens 100 at a distance of between 1 and 10 centimeters, between 10 and 50 cm, or between 50 and 100 cm from eye-side surface of the eye-side lens portion 114. World-side surface of the eye-side lens portion 240 may comprise a curved surface wherein the center or axis of curvature, as appropriate, of world-side surface of the eye-side lens portion 240 may be located on the eye-side of eyeglass lens 100 at a distance of between 1 and 10 centimeters, between 10 and 50 cm, or between 50 and 100 cm from eye-side surface of the eye-side lens portion 114. Eye-side surface of the world-side lens portion 239 may comprise a curved surface wherein the center or axis of curvature, as appropriate, of eye-side surface of the world-side lens portion 239 may be located on the eye-side of eyeglass lens 100 at a distance of between 1 and 10 centimeters, between 10 and 50 cm, or between 50 and 100 cm from eye-side surface of the eye-side lens portion 114. Lens assembly 231 may have a refractive power in a range of −20 to +20 diopters. First LT-OCA layer 235 may comprise a cured LT-OCA layer. Second LT-OCA layer 236 may comprise a cured LT-OCA layer.

Eye-side lens portion 232 may comprise a first lens material. World-side lens portion 233 may comprise a second lens material. The first lens material may possess at least one property relative to the second lens material selected from a group consisting of: lower birefringence, higher transmittance of light of at least one wavelength, higher refractive index, lower refractive index, lower impact resistance, lower strength.

First LT-OCA layer 235 may comprise a first LT-OCA. Second LT-OCA layer 236 may comprise a second LT-OCA. The first LT-OCA and the second LT-OCA may be the same LT-OCA. The first LT-OCA and the second LT-OCA may comprise different LT-OCAs.

Figure 3:
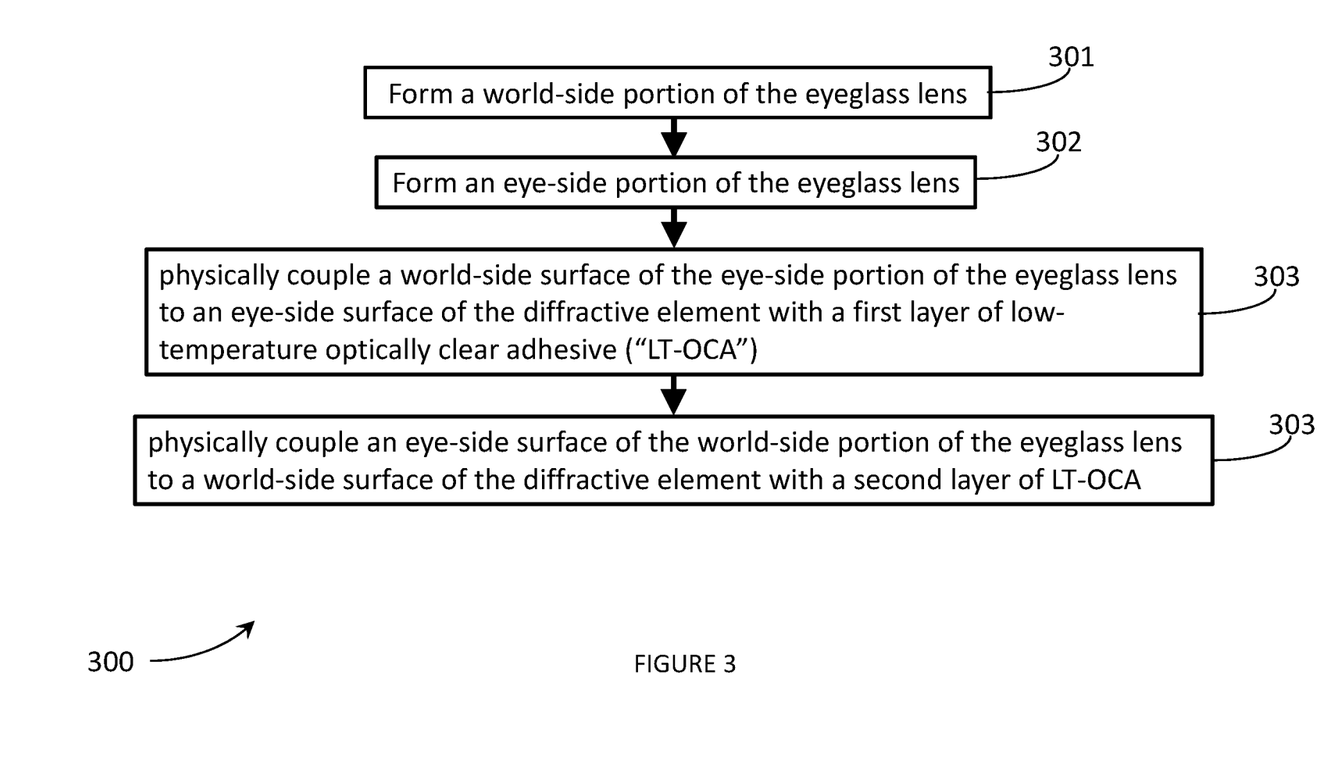
FIG. 3 is a flow-diagram showing a method of embedding a HOE in an eyeglass lens in accordance with the present systems, devices, and methods.

FIG. 3 is a flow-diagram showing a method 300 of embedding a HOE in an eyeglass lens in accordance with the present systems, devices, and methods. Method 300 includes four acts 301, 302, 303, and 304 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

As an illustrative example of the physical elements of method 300, analogous structures from FIG. 1 are called out in parentheses throughout the description of acts 301, 302, 303, and 304.

At 301, the eye-side portion of the eyeglass lens (111) is formed. Forming the eye-side portion of the eyeglass lens may include at least one process chosen from a group comprising any one or more of: casting, injection-molding, cutting, grinding, lapping, annealing, polishing, coating, and edging, and in any order that achieves the desired characteristics of the eyeglass lens (111). Forming the eye-side portion of the eyeglass lens (111) may include forming the eye-side portion of the eyeglass lens (111) at a temperature that exceeds the maximum stable temperature of the HOE. Forming the eye-side portion of the eyeglass lens (111) may be enabled by forming the eye-side portion of the eyeglass lens (111) at temperatures above the maximum stable temperature of the HOE. Forming the eye-side portion of the eyeglass lens (111) may be improved by forming the eye-side portion of the eyeglass lens (111) at temperatures above the maximum stable temperature of the HOE.

At 302, the world-side portion of the eyeglass lens (112) is formed. Forming the world-side portion of the eyeglass lens (112) may include at least one process chosen from a group comprising any one or more of: casting, injection-molding, cutting, grinding, lapping, annealing, polishing, coating, and edging, and in any order that achieves the desired characteristics of the eyeglass lens (112). Forming the world-side portion of the eyeglass lens (112) may include forming the world-side portion of the eyeglass lens (112) at a temperature that exceeds a maximum stable temperature of the HOE. Forming the world-side portion of the eyeglass lens (112) may be enabled by forming the world-side portion of the eyeglass lens (112) at temperatures above the maximum stable temperature of the HOE. Forming the world-side portion of the eyeglass lens (112) may be improved by forming the world-side portion of the eyeglass lens (112) at temperatures above the maximum stable temperature of the HOE.

At 303, the world-side surface of the eye-side portion of the eyeglass lens (111) is physically coupled to an eye-side surface of the HOE (120) with a first layer of LT-OCA (131).

At 304, the eye-side surface of the world side portion of the eyeglass lens (112) is physically coupled a world-side surface of the HOE (120) with a second layer of LT-OCA (132).

The LT-OCA may be cured at a temperature that is below the maximum stable temperature of the HOE. Curing the LT-OCA at a temperature below the maximum stable temperature of the HOE prevents thermal damage to the HOE. The LT-OCA may be photo-cured. Photo-curing may be performed at a temperature below the maximum stable temperature of the HOE. Photo-curing the LT-OCA with visible light is particularly advantageous since eyeglass lens materials are typically opaque to infra-red and ultra-violet light, but eyeglass lenses are typically transparent to visible light.

Forming the world-side portion of the eyeglass lens (112) may include shaping the world-side portion of the eyeglass lens (112) to have a curved world-side surface (116), wherein the center or axis of curvature, as appropriate, of the world-side surface of the world-side portion of the eyeglass lens (116) may be located on the eye-side of the eyeglass lens (100) at a distance of between 1 and 10 centimeters, between 10 and 50 cm, or between 50 and 100 cm from eye-side surface of the eye-side lens portion (114). Forming an eye-side portion of the eyeglass (111) lens may include shaping the eye-side portion of the eyeglass lens (111) to have a curved eye-side surface (114), wherein the center or axis of curvature, as appropriate, of the eye-side surface of the world-side portion of the eyeglass lens (114) may be located on the eye-side of the eyeglass lens (100) at a distance of between 1 and 10 centimeters, between 10 and 50 cm, or between 50 and 100 cm from eye-side surface of the eye-side lens portion (114). Eyeglass lenses with curved outer surfaces are more aesthetically pleasing than eyeglass lenses with planar outer surfaces. Shaping the world-side portion of the eyeglass lens (112) to have a curved world-side surface (116) and shaping the eye-side portion of the eyeglass lens (111) to have a curved eye-side surface (114) may be performed individually or together to provide the eyeglass lens (100) with a refractive power in a range of −20 to +20 diopters; a person skilled in the art will appreciate that the center or axis of curvature, as appropriate, of the eye-side surface of the eyeglass lens (114) and/or the world-side surface of the eyeglass lens (116) may be located on either the eye-side or the world-side of the eyeglass lens (100) if necessary or advantageous to achieve the desired refractive power. An eyeglass lens (100) with a refractive power may be used to provide vision correction as prescribed by an optometrist.

The refractive power for vision correction may be formed by shaping the eye-side surface of the world-side lens portion. Shaping the eye-side surface of the world-side lens portion may include applying an aspheric, atoric, and/or a complex progressive curvature to the eye-side surface of the world-side lens portion. Shaping the eye-side surface of the world-side lens portion may be performed prior to physically coupling the eye-side surface of the world side portion of the eyeglass lens (112) to the world-side surface of the HOE (120) with a second layer of LT-OCA (132). The refractive power for vision correction may be formed shaping the world-side surface of the eye-side lens portion. Shaping the world-side surface of the eye-side lens portion may include applying an aspheric, atoric, and/or a complex progressive curvature to the world-side surface of the eye-side lens portion. Shaping the world-side surface of the eye-side lens portion may be performed prior to physically coupling the world-side surface of the eye-side portion of the eyeglass lens (111 to the eye-side surface of the HOE (120) with a first layer of LT-OCA (131). Forming a world-side portion of the eyeglass lens (112) may include shaping the world-side portion of the eyeglass lens (112) to have a planar eye-side surface (115). Forming an eye-side portion of the eyeglass lens may include shaping the eye-side portion of the eyeglass lens to have a planar world-side surface (113). The HOE (120) may be planar, wherein eye-side surface of the HOE (120) comprises a planar surface, the world-side surface of the HOE (120) comprises a planar surface, and eye-side surface of the HOE (120) and world-side surface of the HOE (120) are parallel. A planar HOE (120) does not require correction for astigmatism, and better adhesion is obtained when a planar HOE (120) is physically coupled to a planar surface of an eyeglass lens portion.

Forming a world-side portion of the eyeglass lens (112) may include shaping the world-side portion of the eyeglass lens to have a curved eye-side surface (115), wherein the center or axis of curvature, as appropriate, of the eye-side surface of the world-side portion of the eyeglass lens (115) may be located on the eye-side of the eyeglass lens (100) at a distance of between 1 and 10 centimeters, between 10 and 50 cm, or between 50 and 100 cm from eye-side surface of the eye-side lens portion (114). Forming an eye-side portion of the eyeglass lens (111) may include shaping the eye-side portion of the eyeglass lens (111) to have a curved world-side surface (113), wherein the center or axis of curvature, as appropriate, of the world-side surface of the eye-side portion of the eyeglass lens (113) may be located on the eye-side of the eyeglass lens (100) at a distance of between 1 and 10 centimeters, between 10 and 50 cm, or between 50 and 100 cm from eye-side surface of the eye-side lens portion (114). Curvature may be applied to the HOE (120), wherein the center or axis of curvature, as appropriate, of the HOE (120) may be located on the eye-side of the eyeglass lens (100) at a distance of between 1 and 10 centimeters, between 10 and 50 cm, or between 50 and 100 cm from eye-side surface of the eye-side lens portion (114). A curved HOE (120) is better able to fit entirely within the internal volume of an eyeglass lens (100), and better adhesion is obtained when a curved HOE (120) is physically coupled to a curved surface of an eyeglass lens portion.

The HOE (120) may include at least one photopolymer layer. The HOE (120) may be formed. Forming the HOE (120) may include recording at least one hologram in the at least one photopolymer layer.

At least one coating may be applied to at least one surface of the eyeglass lens (100). Any applied coating may be a high-temperature coating, and application of a high-temperature coating to an eyeglass lens (100) will not cause damage to the HOE if the high-temperature coating is applied to the lens assembly (110) prior to physically coupling the world-side lens portion (112) to the HOE (120) and prior to physically coupling the eye-side lens portion (111) to the HOE (120). Application of at least one coating may be time-consuming, for example the time required to apply and cure a hard coat may exceed 2 hours. An eyeglass lens with embedded HOE may be fabricated by photo-curing an LT-OCA in less than two hours, in less than one hour, or in less than 10 minutes. Faster eyeglass lens fabrication may reduce the cost of fabrication. Faster eyeglass lens fabrication may allow bespoke eyeglasses to be produced while a customer waits.

Forming a world-side portion of the eyeglass lens (112) may include forming a world-side portion of the eyeglass lens (112) where the world-side portion of the eyeglass lens (112) comprises a first lens material. Forming an eye-side portion of the eyeglass lens (111) may include forming an eye-side portion of the eyeglass lens (111) where the eye-side portion of the eyeglass lens (111) comprises a second lens material. The first lens material may possess at least one property relative to the second lens material selected from a group consisting of: lower birefringence, higher transmittance of light of at least one wavelength, higher refractive index, lower refractive index, lower impact resistance, lower strength. The first lens material possessing at least one of: lower birefringence, higher transmittance of light of at least one wavelength, higher refractive index, and lower refractive index may be advantageous for the playback performance of a hologram which may be embedded in the HOE (120); hologram playback only occurs through the eye-side lens portion (111). The first lens material and the second lens material may be different lens materials.

Physically coupling an eye-side surface of the world-side portion of the eyeglass lens (115) to a world-side surface of the HOE (121) with a first layer of LT-OCA (132) may include physically coupling an eye-side surface of the world-side portion of the eyeglass lens (116) to a world-side surface of the HOE (121) with a first layer of LT-OCA (132), where the first layer of LT-OCA (132) may comprises a first LT-OCA.

Physically coupling a world-side surface of the eye-side portion of the eyeglass lens (113) to an eye-side surface of the HOE (122) with a second layer of LT-OCA (131) may include physically coupling a world-side surface of the eye-side portion of the eyeglass lens (113) to an eye-side surface of the HOE (122) with a second layer of LT-OCA (131) where the second layer of LT-OCA (131) may comprises a second LT-OCA layer. The first LT-OCA and the second LT-OCA may be different LT-OCAs. If the eye-side lens portion (111) and the world-side lens portion (112) comprise different lens materials, the use different LT-OCAs is advantageous since different LT-OCAs may provide stronger adhesion to different lens materials.

A first alternative embodiment of method 300 includes act 302 and act 303, omitting act 301 and act 304. The first alternative embodiment may further comprise applying at least one coating to the HOE. The at least one coating may include a hard coat, an anti-reflective coating, a neutral density tint, a colored coating, a wavelength specific coating, a photochromic coating, and/or an electrochromic coating.

A person of skill in the art will appreciate that the various embodiments for lenses with a diffractor embedded therein described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Provisional patent Application Ser. No. 62/565,677; U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Publication No. US 2015-0378161 A1, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/156,736, U.S. Provisional Patent Application Ser. No. 62/214,600, U.S. Provisional Patent Application Ser. No. 62/167,767, U.S. Provisional Patent Application Ser. No. 62/271,135, U.S. Provisional Patent Application Ser. No. 62/245,792, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, US Patent Application Publication No. US 2017-0068095 A1; US Patent Application Publication No. US 2017-0212290 A1; U.S. Provisional Patent Application Ser. No. 62/482,062; U.S. Provisional Patent Application Ser. No. 62/534,099, U.S. Provisional Patent Application Ser. No. 62/557,551, and U.S. Provisional Patent Application Ser. No. 62/557,554 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An eyeglass lens for use in a wearable heads-up display, the eyeglass lens comprising:
    a lens assembly comprising
        an eye-side lens portion; and
        a world-side lens portion;
    a holographic optical element ("HOE") positioned within the lens assembly in between the eye-side lens portion and the world-side lens portion;
    a first low-temperature optically clear adhesive ("LT-OCA") layer disposed between the HOE and the eye-side lens portion, wherein the first LT-OCA layer is configured to be applied at a temperature of less than 40 degrees Celsius; and
    a second LT-OCA layer disposed between the HOE and the world-side lens portion, wherein the HOE is curved around a center or axis of curvature located on the eye-side lens portion of the eyeglass lens, and wherein the eye-side lens portion includes a curved eye-side surface and a curved world-side surface.

2. The eyeglass lens of claim 1 wherein the world-side lens portion includes a world-side surface, and wherein the world-side lens portion further comprises a coating layer disposed on the world-side surface of the world-side lens portion, the coating layer comprising a high-temperature coating.

3. The eyeglass lens of claim 1 wherein the HOE includes a photopolymer layer and a protective layer.

4. The eyeglass lens of claim 1 wherein the world-side lens portion includes a curved world-side surface.

5. The eyeglass lens of claim 1 wherein the first LT-OCA layer comprises a cured LT-OCA.

6. The eyeglass lens of claim 1 wherein the eye-side lens portion further comprises a coating layer located on the curved eye-side surface of the eye-side lens portion, the coating layer comprising a high-temperature coating.

7. The eyeglass lens of claim 1 wherein the second LT-OCA layer comprises a cured LT-OCA.

8. The eyeglass lens of claim 1 wherein the eye-side lens portion comprises a first lens material and wherein the world-side lens portion comprises a second lens material, and wherein the first lens material is different from the second lens material.

9. The eyeglass lens of claim 1 wherein the first LT-OCA layer comprises a first LT-OCA and wherein the second LT-OCA layer comprises a second LT-OCA, and wherein the first LT-OCA is different from the second LT-OCA.

10. The eyeglass lens of claim 1 wherein the HOE comprises a light guide.

11. An eyeglass lens for use in a wearable heads-up display, the eyeglass lens comprising:
    a lens assembly comprising
        an eye-side lens portion; and
        a world-side lens portion;
    a holographic optical element ("HOE") positioned within the lens assembly in between the eye-side lens portion and the world-side lens portion;
    a first low-temperature optically clear adhesive ("LT-OCA") layer disposed between the HOE and the eye-side lens portion; and
    a second LT-OCA layer disposed between the HOE and the world-side lens portion, wherein the HOE comprises a low refractive index layer.

12. An eyeglass lens for use in a wearable heads-up display, the eyeglass lens comprising:
- a lens assembly comprising
  - an eye-side lens portion; and
  - a world-side lens portion;
- a holographic optical element ("HOE") positioned within the lens assembly in between the eye-side lens portion and the world-side lens portion;
- a first low-temperature optically clear adhesive ("LT-OCA") layer disposed between the HOE and the eye-side lens portion; and
- a second LT-OCA layer disposed between the HOE and the world-side lens portion, wherein the HOE comprises an internal anti-reflective layer.

13. A wearable heads-up display comprising:
- a support structure;
- a projector; and
- a transparent combiner positioned and oriented to appear in a field of view of an eye of a user when the support structure is worn on a head of the user, the transparent combiner comprising:
  - a lens assembly, wherein the lens assembly comprises:
    - an eye-side lens portion; and
    - a world-side lens portion;
  - a holographic optical element ("HOE") positioned within the lens assembly in between the eye-side lens portion and the world-side lens portion;
  - a first low-temperature optically clear adhesive ("LT-OCA") layer disposed between the HOE and the eye-side lens portion of the lens assembly, wherein the first LT-OCA layer is configured to be applied at a temperature of less than 40 degrees Celsius; and
  - a second LT-OCA layer disposed between the HOE and the world-side lens portion of the lens assembly, wherein the first LT-OCA layer comprises a first LT-OCA, wherein the second LT-OCA layer comprises a second LT-OCA, and wherein the first LT-OCA is different from the second LT-OCA.

14. A method of embedding a holographic optical element ("HOE") in an eyeglass lens for use in a wearable heads-up display, the method comprising:
- forming a lens assembly, wherein forming the lens assembly comprises:
  - forming an eye-side portion of the eyeglass lens;
  - forming a world-side portion of the eyeglass lens;
- physically coupling a world-side surface of the eye-side portion of the eyeglass lens to an eye-side surface of the HOE with a first layer of low-temperature optically clear adhesive ("LT-OCA"), wherein the first layer of LT-OCA is disposed directly between the eye-side portion of the eyeglass lens and the HOE and is formulated to be cured at a temperature of less than 40 degrees Celsius; and
- physically coupling an eye-side surface of the world-side portion of the eyeglass lens to a world-side surface of the HOE with a second layer of LT-OCA, wherein the first layer of LT-OCA comprises a first LT-OCA, wherein the second layer of LT-OCA comprises a second LT-OCA, and wherein the first LT-OCA is different from the second LT-OCA.

* * * * *